United States Patent
Thakur et al.

(10) Patent No.: US 10,705,926 B2
(45) Date of Patent: Jul. 7, 2020

(54) DATA PROTECTION AND RECOVERY ACROSS RELATIONAL AND NON-RELATIONAL DATABASES

(71) Applicant: Rubrik, Inc., Palo Alto, CA (US)

(72) Inventors: Tarun Thakur, Fremont, CA (US);
Prasenjit Sarkar, Los Gatos, CA (US);
Pin Zhou, San Jose, CA (US)

(73) Assignee: RUBRIK, INC., Palo Alto, CA (US)

( * ) Notice: Subject to any disclaimer, the term of this patent is extended or adjusted under 35 U.S.C. 154(b) by 298 days.

(21) Appl. No.: 15/663,971

(22) Filed: Jul. 31, 2017

(65) Prior Publication Data

US 2018/0032411 A1 Feb. 1, 2018

Related U.S. Application Data

(60) Provisional application No. 62/368,592, filed on Jul. 29, 2016.

(51) Int. Cl.
*G06F 7/00* (2006.01)
*G06F 11/14* (2006.01)
*G06F 16/28* (2019.01)
*G06F 16/25* (2019.01)

(52) U.S. Cl.
CPC ...... *G06F 11/1469* (2013.01); *G06F 11/1451* (2013.01); *G06F 16/284* (2019.01); *G06F 16/25* (2019.01); *G06F 2201/80* (2013.01); *G06F 2201/835* (2013.01)

(58) Field of Classification Search
CPC .............. G06F 11/1469; G06F 16/284; G06F 11/1451; G06F 16/25; G06F 2201/835; G06F 2201/80

USPC ................ 707/684, 674, 679, 690
See application file for complete search history.

(56) References Cited

U.S. PATENT DOCUMENTS

| | | | | |
|---|---|---|---|---|
| 7,672,934 | B1* | 3/2010 | Beatty | G06F 11/1451 707/999.003 |
| 8,407,196 | B1* | 3/2013 | Kryukov | G06F 21/566 707/705 |
| 10,169,446 | B1* | 1/2019 | Garlapati | G06F 16/284 |
| 10,423,493 | B1* | 9/2019 | Vig | G06F 11/1451 |
| 2002/0078068 | A1* | 6/2002 | Krishnaprasad | G06F 16/284 |
| 2009/0173783 | A1* | 7/2009 | Fomitchev | G06Q 20/04 235/380 |
| 2010/0145914 | A1* | 6/2010 | Kanno | G06F 16/2329 707/638 |
| 2011/0258178 | A1* | 10/2011 | Eidson | G06F 17/30389 707/714 |
| 2012/0030172 | A1* | 2/2012 | Pareek | G06F 16/3331 707/635 |

(Continued)

*Primary Examiner* — Mohammed R Uddin
(74) *Attorney, Agent, or Firm* — Schwegman Lundberg & Woessner, P.A.

(57) ABSTRACT

Embodiments disclosed herein provide systems, methods, and computer readable media for recovering data across relational and non-relational databases. In a particular embodiment, a method includes identifying first data having a first version time in a first version store storing data versions from a relational database. Based on the first version time, the method provides identifying second data, associated with the first data, in a second version store storing data versions from a non-relational database. The method further provides recovering the first data to the relational database and the second data to the non-relational database.

19 Claims, 7 Drawing Sheets

(56) References Cited

U.S. PATENT DOCUMENTS

| | | | |
|---|---|---|---|
| 2012/0209816 A1* | 8/2012 | Bank | G06F 11/1492 |
| | | | 707/674 |
| 2013/0024427 A1* | 1/2013 | Long | G06F 11/1448 |
| | | | 707/674 |
| 2014/0379638 A1* | 12/2014 | Li | G06F 16/27 |
| | | | 707/610 |
| 2016/0092525 A1* | 3/2016 | Kothari | G06F 16/219 |
| | | | 707/602 |
| 2017/0006135 A1* | 1/2017 | Siebel | H04L 67/02 |
| 2017/0075764 A1* | 3/2017 | Banister | G06F 11/1469 |
| 2017/0185636 A1* | 6/2017 | Horii | G06F 16/22 |

\* cited by examiner

DATA PROTECTION AND RECOVERY ACROSS RELATIONAL AND NON-RELATIONAL DATABASES

RELATED APPLICATIONS

This application is related to and claims priority to U.S. Provisional Patent Application 62/368,592, titled "DATA PROTECTION AND RECOVERY ACROSS RELATIONAL AND NON-RELATIONAL DATABASES," filed Jul. 29, 2016, and which is hereby incorporated by reference in its entirety.

TECHNICAL FIELD

Aspects of the disclosure are related to the protection and recovery of data items in databases and, in particular, to protecting and recovering data items in environments having data in both relational and non-relational databases.

Overview

Embodiments disclosed herein provide systems, methods, and computer readable media for recovering data across relational and non-relational databases. In a particular embodiment, a method includes identifying first data having a first version time in a first version store storing data versions from a relational database. Based on the first version time, the method provides identifying second data, associated with the first data, in a second version store storing data versions from a non-relational database. The method further provides recovering the first data to the relational database and the second data to the non-relational database.

In some embodiments, a first relational data version of the relational data versions includes the first data and was created at the first version time and a first non-relational data version of the non-relational data versions includes the second data. In those embodiments, identifying the second data may comprise identifying the first non-relational data version from among the non-relational data versions based on the first non-relational data version having been created at the first version time.

Also in those embodiments, recovering the first data to the relational database and the second data to the non-relational database may comprise restoring the relational database to the first relational data version and restoring the non-relational database to the first non-relational data version. In some cases, restoring the relational database to the first relational data version comprises instructing a relational versioning system to restore the relational database to the first relational data version and restoring the non-relational database to the first non-relational data version comprises instructing a non-relational versioning system to restore the non-relational database to the first non-relational data version.

In some embodiments, the method further includes, at the first version time, creating both the first relational data version and the first non-relational data version. In those embodiments, creating both the first relational data version and the first non-relational data version may include instructing a relational versioning system to create and store the first relational data version in the first version store and instructing a non-relational versioning system to create and store the first non-relational data version in the second version store.

In some embodiments, the method includes identifying a timestamp associated with one or more data entries stored in the relational database and identifying the first version time corresponding to the timestamp. The one or more data entries may comprise a transaction.

In another embodiment, a system is provided having one or more computer readable storage media and a processing system operatively coupled with the one or more computer readable storage media. Program instructions stored on the one or more computer readable storage media, when read and executed by the processing system, direct the processing system to identify first data having a first version time in a first version store storing relational data versions from a relational database. The program instructions further direct the processing system to, based on the first version time, identify second data, associated with the first data, in a second version store storing non-relational data versions from a non-relational database. The program instructions also direct the processing system to recover the first data to the relational database and the second data to the non-relational database.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Many applications that access databases are configured to access both relational and non-relational types of databases, such as Structured Query Language (SQL) and NoSQL databases, respectively. A relational database is managed based on the relational model for database management and has a well described data schema while a non-relational database typically lacks a well defined schema and is inefficient at relational queries. An application that accesses both types of databases likely manages data in one type of database that is associated with data in the other type of database. Even though data in one type of database may be related to data in another type of database, the protection schemes used on each type of data run independently of one another making it difficult to restore associated data in both types of databases.

Figure 1:
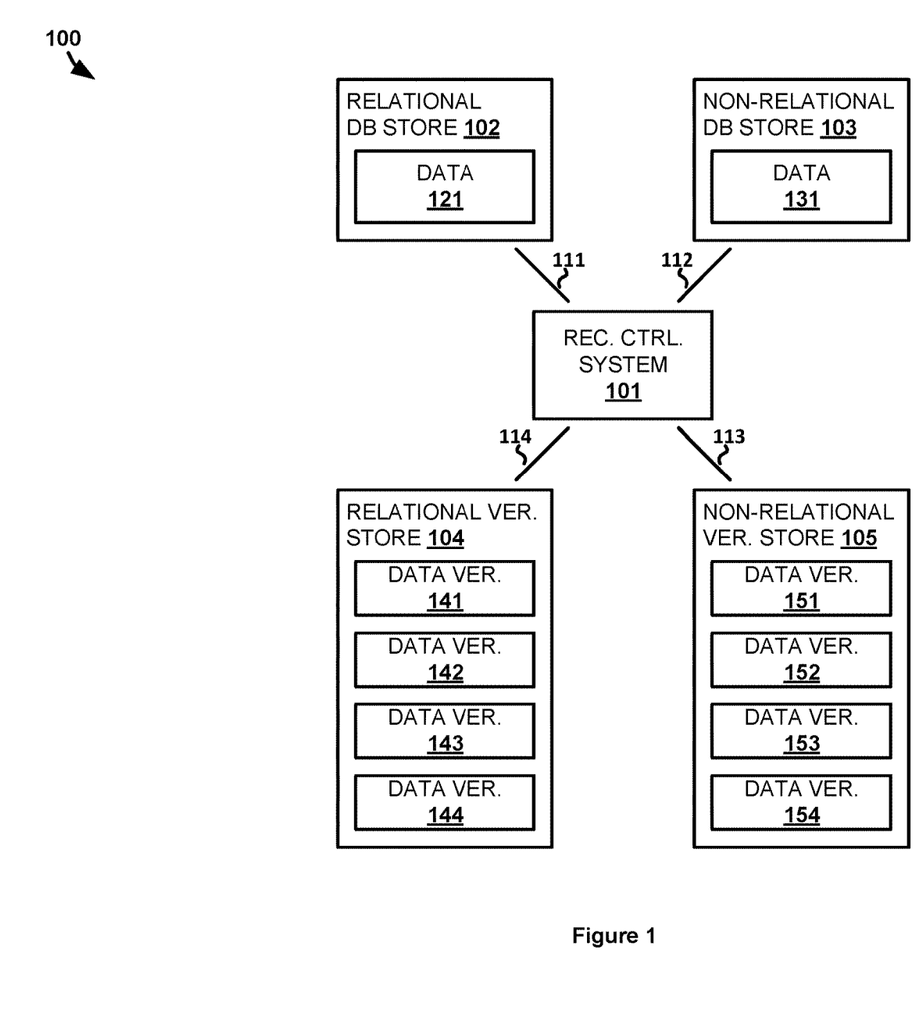
FIG. 1 illustrates a computing environment for recovering data items across relational and non-relational databases.

FIG. 1 illustrates computing environment 100 for recovering data items across relational and non-relational databases. Computing environment 100 includes recovery control system 101, relational database store 102, non-relational database store 103, relational version store 104, and non-relational version store 105. Relational database store 102, non-relational database store 103, relational version store 104 and non-relational version store 105 communicate with recovery control system 101 over communication links 111-114.

In operation, relational database store 102 stores data 121 in a relational database and non-relational database store 103 stores data 131 in a non-relational database. Relational version store 104 and non-relational version store 105 store data versions 141-144 and 151-154, respectively. Recovery control system 101 may itself control the protection of data 121 and data 131 through the creation of each data version or another system(s) may be employed to protect data 121 and data 131 through creation of the data versions. For instance, a relational database versioning tool may be used to create versions 141-144 while an independent non-relational database versioning tool may be used to create versions 151-154. Regardless of what system creates the data versions, since the structure of relational databases and non-relational databases differs, the versioning may not be consistent between the two databases. Therefore, recovery control system 101 manages the recovery of data in each of relational database store 102 and non-relational database store 103 by ensuring that the proper version of associated data is selected from each of relational version store 104 and non-relational version store 105. Appendix A includes a further example of an environment with relational and non-relational data stores.

Figure 2:
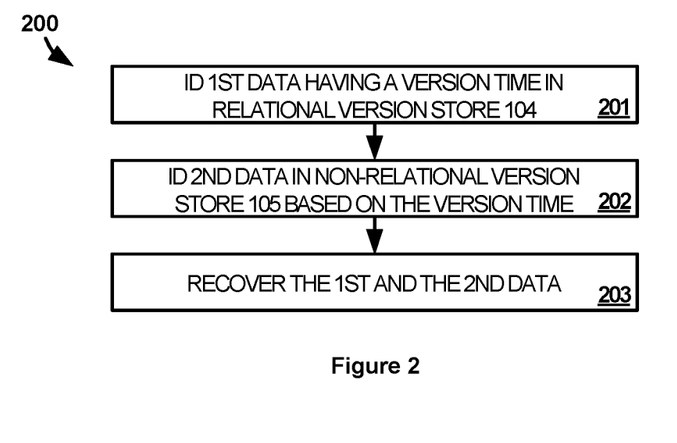
FIG. 2 illustrates a method of operating the computing environment to recover data items across relational and non-relational databases.

FIG. 2 illustrates method 200 of operating the computing environment to recover data items across relational and non-relational databases. Method 200 provides recovery control system 101 identifying first data having a first version time in a first version database storing data versions from a relational database (step 201). For example, recovery control system 101 may identify data version 143, which is a version of data 121. Recovery control system 101 may identify data version 143 itself or may identify data version 143 by interacting with another system that handles the versioning of relational database store 102. In some cases, data 121 may represent the entirety of the data in a relational database in relational database store 102 or may only be a portion, such as one or more data items, within that relational database. A version of relational database data is selected before a version of non-relational database data due to the relational nature of relational database data items. Specifically, data items in a relational database are most likely to include a definitive timestamp (e.g., transaction time). For example, in ecommerce, a specific transaction may be stored in a relational database with a time in which that transaction occurred. Thus, the version created at or around that time can be selected. In some cases, it is a user that indicates the version time or transaction that recovery control system 101 identifies at step 201. For example, if data was corrupted after a given transaction occurred, then a user may indicate to recovery control system 101 that data should be recovered to a version before that transaction occurred.

Based on the first version time, method 200 provides recovery control system 101 identifying second data, associated with the first data, in a second version database storing data versions from a non-relational database (step 202). Continuing the example from above, the second data could be data associated with the transaction used in step 201. For instance, the second data may include customer profile information (e.g. address, phone number, shopping preferences, etc.) or some other type of information that could be stored in a non-relational database. In this example, recovery control system 101 may determine that data version 152 is the version of data 131 that corresponds to data version 143 based on the first version time. Like in step 201, recovery control system 101 may identify data version 152 itself or may identify data version 152 by interacting with another system that handles the versioning of non-relational database store 103. Since it is possible that data versions 151-155 are not created on the same schedule as data versions 141-145, the version time for data version 143 may be different than the version time for data version 152. For instance, if recovery control system 101 is recovering data to before a time in which a transaction occurred, data version 153 may have a version time after the transaction while selected data version 152 has a version time before the transaction while the version time of version 143 is somewhere in between. As such, data version 152 is selected to recover non-relational database store 103 to before the transaction occurred.

Once data versions are identified, method 200 provides recovery control system 101 recovering the first data to the relational database and the second data to the non-relational database (step 203). In this example, recovery control system 101 recovers data version 143 to data 121 in relational database store 102 and recovers data version 152 to data 131 in non-relational database store 103. Recovery control system 101 may perform the steps necessary to recover data versions 143 and 152 itself or may recover data versions 143 and 152 by interacting with other systems that handle the recovery of relational database store 102 and non-relational database store 103, respectively.

Advantageously, recovery control system 101 is able to coordinate the recovery of both relational and non-relational databases so that associated data stored across the two types of databases can be properly be recovered to a desired state.

The examples above are discussed with respect to a relational database and a non-relational database along with the respective database and versioning systems thereof. However, recovery control system 101 may be used with any number/combination of databases with corresponding database systems and versioning systems. For example, recovery control system 101 may coordinate the recovery of five database systems in any ratio of relational to non-relational databases, including all relational or all non-relational. Likewise, while the version time in the above examples is determined based on a time associated with the data stored in a relational database, it is possible for a non-relational database to maintain the data entry time information used to identify the version time above. As such, step 201 above may be performed with respect to data from a non-relational database that maintains data entry time information rather than the discussed relational database.

Referring back to FIG. 1, recovery control system 101 comprises a computer system and communication interface. Recovery control system 101 may also include other components such as a router, server, data storage system, and power supply. Recovery control system 101 may reside in a single device or may be distributed across multiple devices. Recovery control system 101 could be an application server(s), a personal workstation, or some other computing system—including combinations thereof. While shown separately, all or portions of recovery control system 101 could be integrated with the components of at least one of stores 102-105.

Stores 102-105 each comprise one or more data storage systems having one or more non-transitory storage medium, such as a disk drive, flash drive, magnetic tape, data storage circuitry, or some other memory apparatus. The data storage systems may also include other components such as processing circuitry, a network communication interface, a router, server, data storage system, user interface and power supply. The data storage systems may reside in a single device or may be distributed across multiple devices. For example, a database store may comprise multiple distributed nodes.

Communication links 111-114 could be internal system busses or use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-114 could be direct links or may include intermediate networks, systems, or devices.

Figure 3:
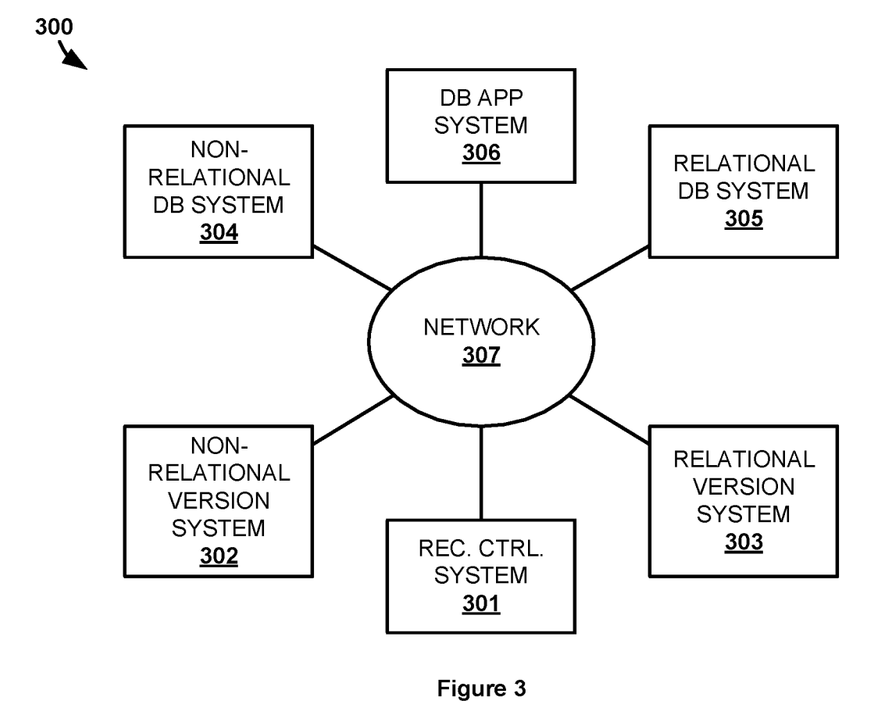
FIG. 3 illustrates another computing environment for recovering data items across relational and non-relational databases.

FIG. 3 illustrates computing environment 300 for recovering data items across relational and non-relational databases. Computing environment 300 includes recovery control system 301, non-relational versioning system 302, relational versioning system 303, non-relational database system 304, relational database system 305, database application system 306, and network 307. Network 307 comprises network elements that allow for data to be exchanged between recovery control system 301, non-relational versioning system 302, relational versioning system 303, non-relational database system 304, relational database system 305, and database application system 306. Network 307 may comprise switches, wireless access nodes, Internet routers, network gateways, application servers, computer systems, communication links, or some other type of communication equipment—including combinations thereof. Network 307 may be a single network, such as a local area network, a wide area network, or the Internet, or may be a combination of multiple networks.

In operation, a database application executes on database application system 306. The database application allows database application system 306 to access both a relational database maintained by relational database system 305 and a non-relational database maintained by non-relational database system 304. Database application system 306 may write information to, read information from, delete information from, or perform some other type of function when accessing the databases—including combinations thereof. For example, database application system 306 may be a user workstation and the user operates database application system 306 to access the databases. While only one database application system 306 is described in this example, it is possible for multiple database application systems to access non-relational database system 304 and relational database system 305 and for multiple applications to access non-relational database system 304 and relational database system 305.

Non-relational versioning system 302 and relational versioning system 303 are configured to protect the databases maintained by non-relational database system 304 and relational database system 305, respectively, by backing up the data stored therein as data versions. It should be understood that, while each of non-relational versioning system 302, relational versioning system 303, non-relational database system 304, and relational database system 305, are illustrated as single devices, their functionality may be spread across multiple devices. For example, the storage system for storing the databases or versions may be separate, and connect to network 307 independently from, non-relational versioning system 302, relational versioning system 303, non-relational database system 304, and/or relational database system 305. Recovery control system 301 is configured to control non-relational versioning system 302 and relational versioning system 303 to enable the restoration of a non-relational database to a point in time that is defined by data in a relational database, as detailed below.

Figure 4:
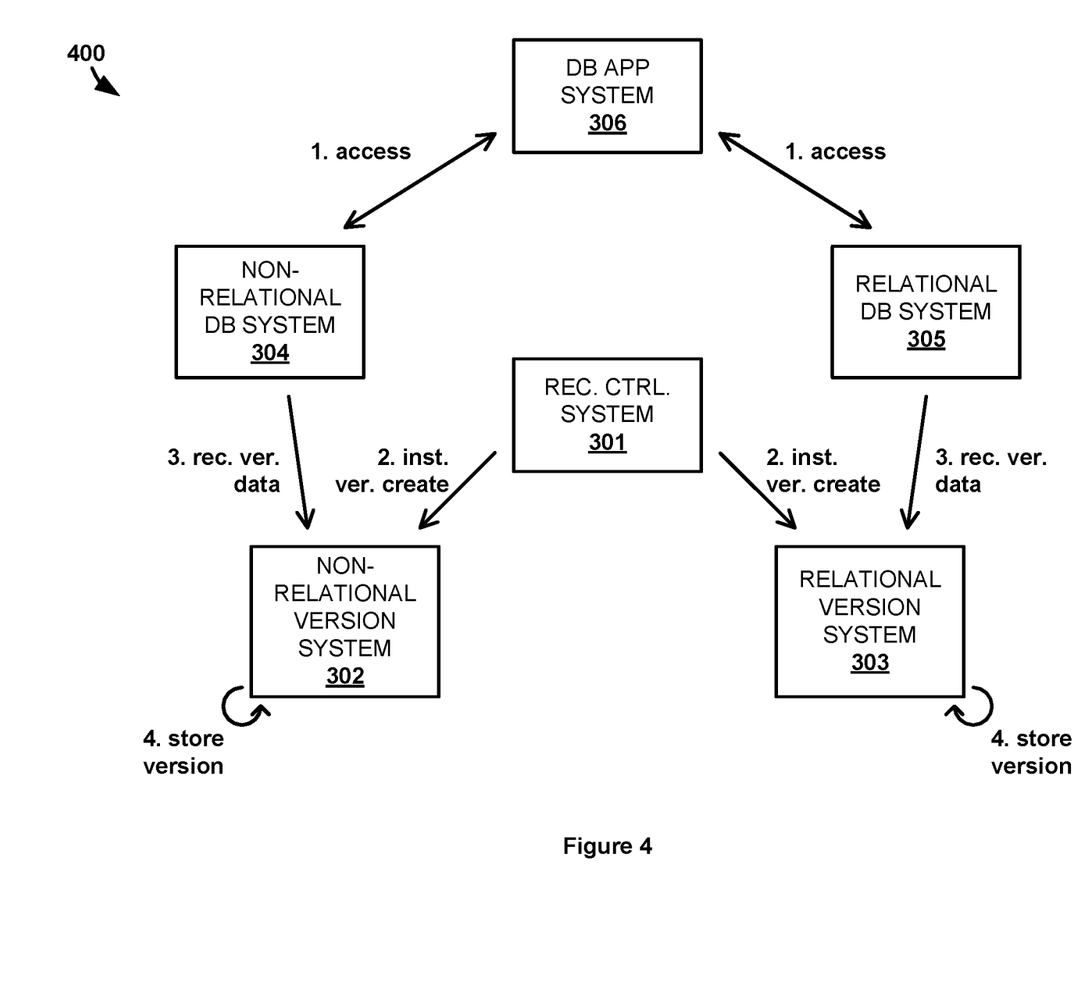
FIG. 4 illustrates a scenario for the other computing environment to recover data items across relational and non-relational databases.

FIG. 4 illustrates scenario 400 for computing environment 300 to recover data items across relational and non-relational databases. In particular, scenario 400 describes the creation of versions for both the relational database of relational database system 305 and the non-relational database of non-relational database system 304 such that the versions of both databases can be restored based on a timestamp for data in the relational database. Scenario 400 begins as database application system 306 is accessing non-relational database system 304 and relational database system 305 in its normal course of operation for accessing the respective databases stored therein. At a point in time, recovery control system 301 determines that versions of the databases in non-relational database system 304 and relational database system 305 should be created and, at step 2, instructs non-relational versioning system 302 and relational versioning system 303 to create a version of the respective data bases. Recovery control system 301 may be configured to instruct the creation of versions on a period schedule (e.g., once per hour), at set times (e.g., 10:00 pm), upon occurrence of a trigger event (e.g., when one database or the other is changed), or some other manner of scheduling database operations. Recovery control system 301 may issue an instruction each time a version should be created or may configure settings of non-relational versioning system 302 and relational versioning system 303 to comply with the versioning schedule determined by recovery control system 301.

At step 3, non-relational versioning system 302 and relational versioning system 303 retrieve data necessary for version creation from respective non-relational database system 304 and relational database system 305. For incremental versioning, non-relational versioning system 302 and relational versioning system 303 may receive only data from non-relational database system 304 and relational database system 305 that has changed from a previous version being created. Non-relational versioning system 302 and relational versioning system 303 use the received data to create a version of the current state of the respective relational and non-relational databases from non-relational database system 304 and relational database system 305. Those versions are stored by non-relational versioning system 302 and relational versioning system 303 at step 4. Essentially, steps 3 and 4 allow non-relational versioning system 302 and relational versioning system 303 to create the versions in the same manner they would if operating independently. However, in this example, recovery control system 301 ensures that non-relational versioning system 302 and relational versioning system 303 create their respective versions at the same time. It should be understood that versions created by non-relational versioning system 302 and relational versioning system 303 may still be considered to have been created at the same time even if there are slight, negligible variations in when each version is created (e.g., a time difference caused by the data for one version taking longer to obtain than the data for the other version).

During steps 2-4 above, database application system 306 may continue to access non-relational database system 304 and relational database system 305 as it did at step 1. Steps 2-4 may repeat so that recovery control system 301 can continue to facilitate the creation of versions as the databases of non-relational database system 304 and relational database system 305 continue to change over time based on database application system 306's access of those databases.

Figure 5:
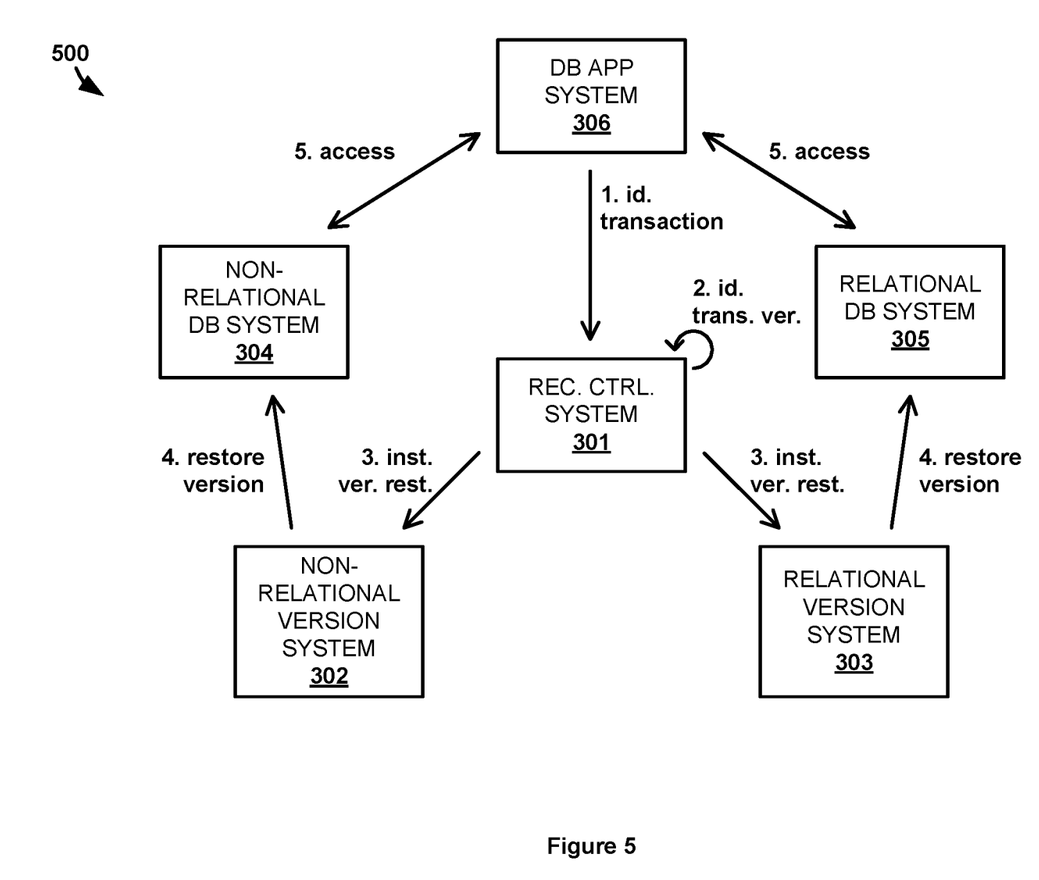
FIG. 5 illustrates another scenario for the other computing environment to recover data items across relational and non-relational databases.

FIG. 5 illustrates scenario 500 for computing environment 300 to recover data items across relational and non-relational databases. In this example, the relational database managed by relational database system 305 includes transactions as the entries therein. A transaction is a data entry that describes multiple steps. For example, a bank transaction moving money from one account to another may include the steps of decrementing the amount being transferred from the origin account, incrementing the amount being transferred in the destination account, and create a record of the transaction. Each step of the transaction modifies the relational database and the transaction is stored in the relational database relative to the time in which the transaction was performed (e.g., each transaction has a timestamp).

In scenario 500, recovery control system 301 receives a transaction identifier at step 1 from database application system 306. The transaction identifier is included with a request to restore the databases of non-relational database system 304 and relational database system 305 to a version before or after, as indicated by the request, the timestamp of the transaction. The transaction identifier may simply be the timestamp for a particular transaction or may also include other information about the transaction, possibly a copy of the transaction itself. Recovery control system 301 uses the timestamp of the transaction to determine corresponding versions at step 2 that should be restored to non-relational database system 304 and relational database system 305, respectively. For example, the identified transaction may have been identified by a user of database application system 306 as having caused data to corrupt in one or both of non-relational database system 304 and relational database system 305. Thus, the user requested that the databases be returned to their state before the transaction was created in the relational database of relational database system 305.

Figure 6:
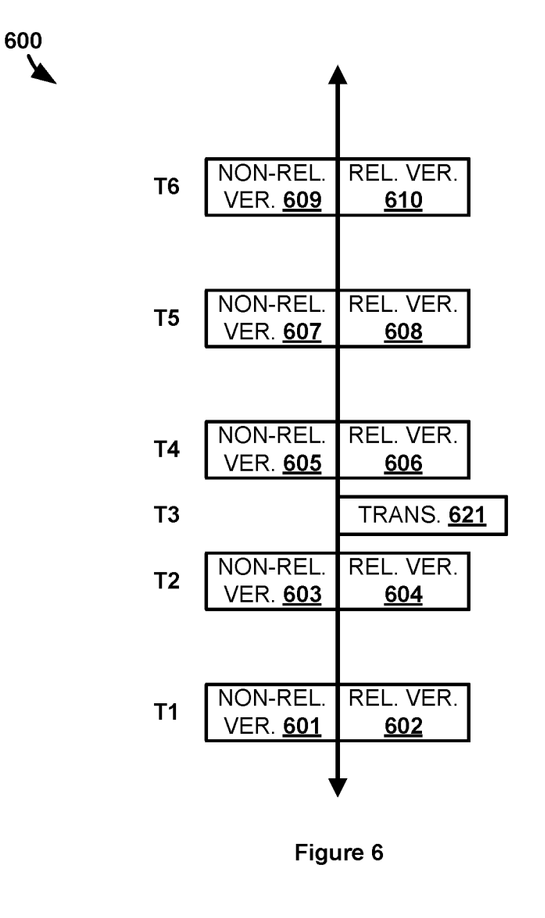
FIG. 6 illustrates yet another scenario for the other computing environment to recover data items across relational and non-relational databases.

In accordance with the above example, recovery control system 301 uses the timestamp to determine a most recent version in relational versioning system 303 that was created before the time of the transaction's timestamp. FIG. 6 illustrates an example timeline 600 to visualize recovery control system 301's identification of the appropriate version at step 2 of scenario 500. Timeline 600 is at least a subset of sequential data versions created by non-relational versioning system 302 and relational versioning system 303. Each pair of relational and non-relational data versions on timeline 600 may have been created through iterations of scenario 400, as described above. Although not shown, additional data versions may have been created before time T1 and/or after time T6. As shown on timeline 600, non-relational data version 601 and relational data version 602 were created at time T1, non-relational data version 603 and relational data version 604 were created at time T2, non-relational data version 605 and relational data version 606 were created at time T3, non-relational data version 607 and relational data version 608 were created at time T5, and non-relational data version 609 and relational data version 610 were created at time T6.

In this example, transaction 621 is the transaction identified at step 1 of scenario 500. The timestamp of transaction 621 is time T2, which is after the creation of non-relational data version 603 and relational data version 604 but before the creation of non-relational data version 605 and relational data version 606. Recovery control system 301 uses the timestamp of transaction 621 at T3 to determine that relational data version 604 was the last version created for the relational database of relational database system 305 before transaction 621 was entered into the relational database. Since recovery control system 301 directed non-relational versioning system 302 to create a version from non-relational database system 304 at the same time relational versioning system 303 created a version from relational database system 305, recovery control system 301 further identifies non-relational data version 603 as also being created at time T2. Thus, from the timestamp T3 of transaction 621, recovery control system 301 identifies version time T2, which corresponds to non-relational data version 603 and relational data version 604.

Referring back to scenario 500, at step 3, recovery control system 301 instructs non-relational versioning system 302 to restore non-relational database system 304 using non-relational data version 603 and instructs relational versioning system 303 to restore relational database system 305 to relational data version 604. Responsive to the instructions from recovery control system 301, at step 4, non-relational versioning system 302 restores non-relational database system 304 to non-relational data version 603 and relational versioning system 303 restores relational database system 305 to relational data version 604. Non-relational versioning system 302 and relational versioning system 303 perform the restoration procedure in the same manner they would if not under the instruction of recovery control system 301. Once non-relational database system 304 and relational database system 305 have been restored to non-relational data version 603 and relational data version 604, database application system 306 accesses non-relational database system 304 and relational database system 305 at step 5 in the state non-relational database system 304 and relational database system 305 were in prior to transaction 621 being created.

Figure 7:
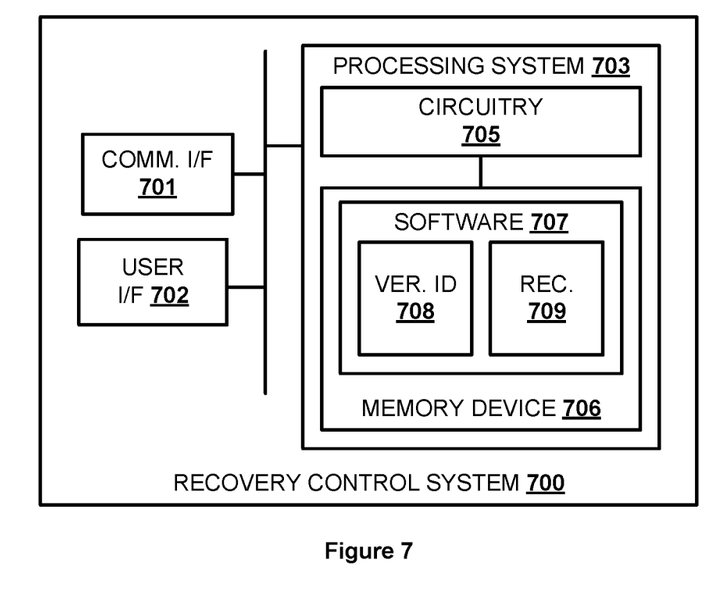
FIG. 7 illustrates a recovery control system for recovering data items across relational and non-relational databases.

FIG. 7 illustrates recovery control system 700. Recovery control system 700 is an example of recovery control system 101, although system 101 may use alternative configurations. Recovery control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes version identification module 708 and recovery module 709. Operating software 707 may further include an operating system, utilities, drivers, network interfaces, applications, or some other type of software. When executed by processing circuitry 705, operating software 707 directs processing system 703 to operate recovery control system 700 as described herein.

In particular, version identification module 708 directs processing system 703 to identify first data having a first version time in a first version store storing data versions from a relational database. Based on the first version time, version identification module 708 further directs processing system 703 to identify second data, associated with the first data, in a second version store storing data versions from a non-relational database. Recovery module 709 directs processing system 703 to recover the first data to the relational database and the second data to the non-relational database.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for recovering data across relational and non-relational databases, the method comprising:
    detecting a data corruption occurred before a transaction;
    identifying, using a transaction identifier, a first data version in a first version store storing relational data versions from a relational database, wherein the transaction identifier includes a timestamp of a transaction, wherein the first data version is a most recent relational data version created before a time of the transaction;
    identifying, using the timestamp, a second data version, associated with the first data version, in a second version store storing non-relational data versions from a non-relational database, wherein respective data protection schemes used on each type of data in the relational and non-relational databases run independently of one another, wherein the first data version and the second data version are created at the same time, wherein the second data version is a most recent non-relational data version created before the time of the transaction;
    restoring the first data version to the relational database; and
    restoring the second data version to the non-relational database.

2. The method of claim 1, wherein a first relational data version comprises the first data version and wherein a first non-relational data version comprises the second data version.

3. The method of claim 2, wherein identifying the second data version comprises:
    identifying the first non-relational data version from among the non-relational data versions based on the first non-relational data version having been created at the first version time.

4. The method of claim 2, wherein recovering the first data version to the relational database and the second data version to the non-relational database comprises:
    restoring the relational database to the first relational data version; and
    restoring the non-relational database to the first non-relational data version.

5. The method of claim 4, wherein:
    restoring the relational database to the first relational data version comprises instructing a relational versioning system to restore the relational database to the first relational data version; and
    restoring the non-relational database to the first non-relational data version comprises instructing a non-relational versioning system to restore the non-relational database to the first non-relational data version.

6. The method of claim 2, further comprising:
    at the first version time, creating both the first relational data version and the first non-relational data version.

7. The method of claim 6, wherein creating both the first relational data version and the first non-relational data version comprises:
    instructing a relational versioning system to create and store the first relational data version in the first version store; and
    instructing a non-relational versioning system to create and store the first non-relational data version in the second version store.

8. The method of claim 1, further comprising:
    identifying a timestamp associated with one or more data entries stored in the relational database; and
    identifying the first version time corresponding to the timestamp.

9. The method of claim 8, wherein the one or more data entries comprise a transaction.

10. A system for recovering data across relational and non-relational databases, the system comprising:
    one or more computer readable storage media;
    a processing system operatively coupled with the one or more computer readable storage media; and
    program instructions stored on the one or more computer readable storage media that, when read and executed by the processing system, direct the processing system to:
    detecting, a data corruption occurred before a transaction;
    identifying, using a transaction identifier, a first data version in a first version store storing relational data versions from a relational database, wherein the transaction identifier includes a timestamp of a transaction, wherein the first data version is a most recent relational data version created before a time of the transaction;
    identifying, using the timestamp, a second data version, associated with the first data version, in a second version store storing non-relational data versions from a non-relational database, wherein respective data protection schemes used on each type of data in the relational and non-relational databases run independently of one another, wherein the first data version and the second data version are created at the same time, wherein the second data version is a most recent non-relational data version created before the time of the transaction;
    restoring the first data version to the relational database; and
    restoring the second data version to the non-relational database.

11. The system of claim 10, wherein a first relational data version comprises the first data version and wherein a first non-relational data version comprises the second data version.

12. The system of claim 11, wherein to identify the second data version, the program instructions direct the processing system to:
identify the first non-relational data version from among the non-relational data versions based on the first non-relational data version having been created at the first version time.

13. The system of claim 11, wherein recovering the first data version to the relational database and the second data version to the non-relational database, the program instructions direct the processing system to:
restore the relational database to the first relational data version; and
restore the non-relational database to the first non-relational data version.

14. The system of claim 13, wherein:
to restore the relational database to the first relational data version, the program instructions direct the processing system to instruct a relational versioning system to restore the relational database to the first relational data version; and
to restore the non-relational database to the first non-relational data version, the program instructions direct the processing system to instruct a non-relational versioning system to restore the non-relational database to the first non-relational data version.

15. The system of claim 11, wherein the program instructions further direct the processing system to:
at the first version time, create both the first relational data version and the first non-relational data version.

16. The system of claim 15, wherein to create both the first relational data version and the first non-relational data version, the program instructions direct the processing system to:
instruct a relational versioning system to create and store the first relational data version in the first version store; and
instruct a non-relational versioning system to create and store the first non-relational data version in the second version store.

17. The system of claim 10, wherein the program instructions further direct the processing system to:
identify a timestamp associated with one or more data entries stored in the relational database; and
identify the first version time corresponding to the timestamp.

18. The system of claim 17, wherein the one or more data entries comprise a transaction.

19. A machine readable medium comprising instructions which, when read by a machine, because the machine to perform operations comprising, at least:
detecting, a data corruption occurred before a transaction;
identifying, using a transaction identifier, a first data version in a first version store storing relational data versions from a relational database, wherein the transaction identifier includes a timestamp of a transaction, wherein the first data version is a most recent relational data version created before a time of the transaction;
based identifying, using the timestamp, a second data version, associated with the first data version, in a second version store storing non-relational data versions from a non-relational database, wherein respective data protection schemes used on each type of data in the relational and non-relational databases run independently of one another, wherein the first data version and the second data version are created at the same time, wherein the second data version is a most recent non-relational data version created before the time of the transaction;
restoring the first data version to the relational database; and
restoring the second data version to the non-relational database.

* * * * *

UNITED STATES PATENT AND TRADEMARK OFFICE
CERTIFICATE OF CORRECTION

PATENT NO.       : 10,705,926 B2
APPLICATION NO.  : 15/663971
DATED            : July 7, 2020
INVENTOR(S)      : Thakur et al.

Page 1 of 1

It is certified that error appears in the above-identified patent and that said Letters Patent is hereby corrected as shown below:

In the Claims

In Column 12, Line 24, in Claim 19, before "identifying,", delete "based"

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*